Patented Oct. 19, 1943

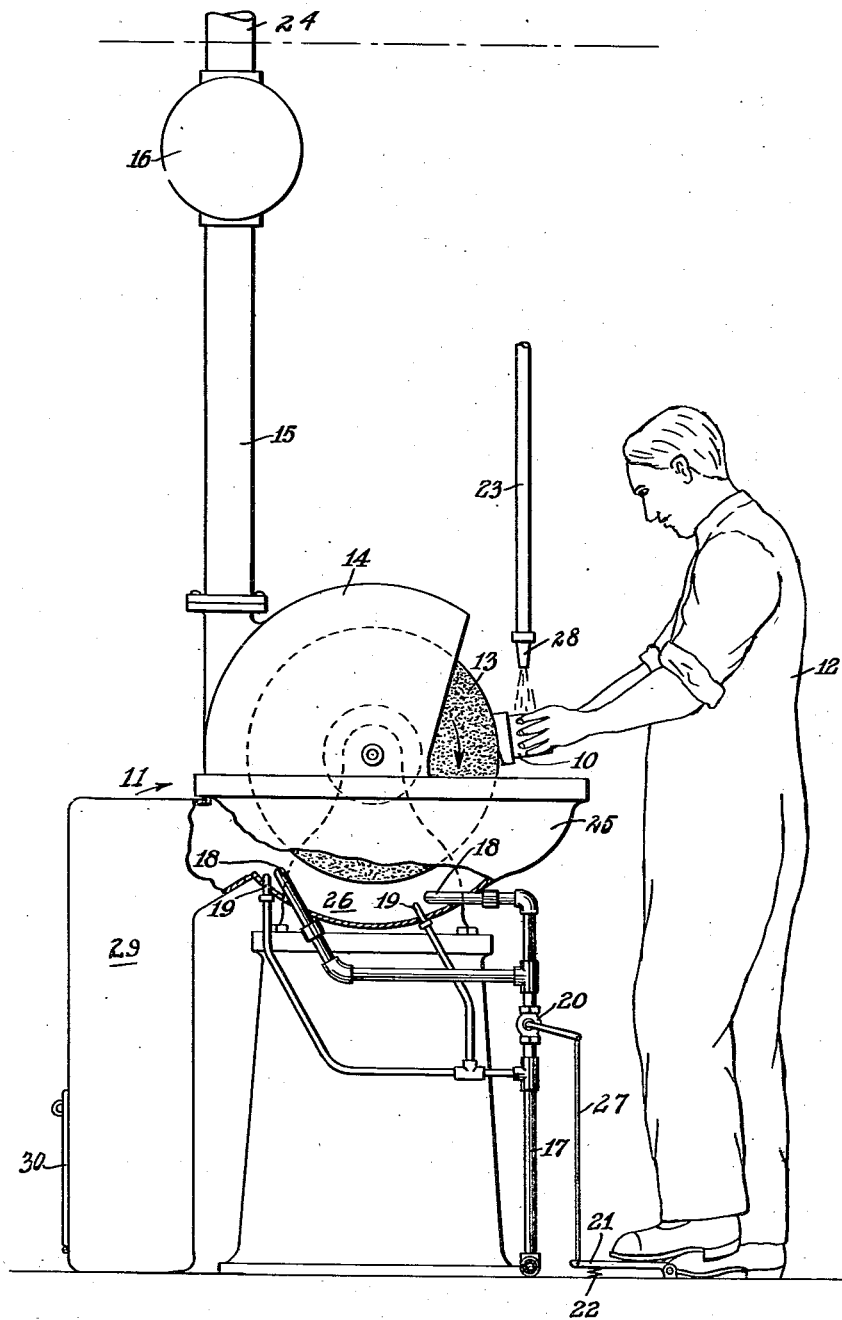

2,331,876

UNITED STATES PATENT OFFICE 2,331,876

SAFETY SYSTEM

Harry J. Walpole, Grantwood, N. J., assignor to Bendix Aviation Corporation, South Bend, Ind., a corporation of Delaware Application December 1, 1941, Serial No. 421,207

6 Claims. (Cl. 51—273)

This invention relates to safety systems, and particularly to machining operations wherein scrap is disposed of.

In the machining of metal, such as castings of magnesium and magnesium alloys, the scrap, particularly in the form of dust and small chips, creates a fire hazard due to the combustible quality of the metal in chip or dust form, which, falling from the machine tool, is allowed to accumulate between sweeping intervals. It is not uncommon for magnesium dust to accumulate to large proportions even between frequent sweeping or cleaning intervals, and in the presence of an accidental spark, the dust or powder will burn intensely, endangering the life of the operator.

The operator of a lathe, grinding wheel or other machine tool, ordinarily (in handling magnesium work) is equipped with fire-resistant face, hand and body covering. However, it is not uncommon for the particles, between sweeping and disposal periods, to accumulate before the machine operator realizes that an appreciable amount of scrap has accumulated, and to be exploded violently by means of an accidental spark. Even when the scrap is safely removed from the plant, it remains a hazard as long as it is stored in bulk. Obviously, the machine operator is exposed to considerable danger, and also, the machine tool itself, and the plant in which it is housed, may suffer considerable damage before the fire is extinguished.

It is an object of the present invention to provide a system whereby castings or other work formed of combustible material may be machined without hazard of fire to the operator or to the machine or other equipment.

It is a further object of the invention to provide a method whereby combustible scrap may be oxidized during a machining operation.

It is an additional object of the invention to provide a means whereby the accumulation of combustible scrap is prevented, and whereby normally combustible scrap is converted continuously into a non-combustible oxide during the machining process.

Yet another object of the invention is to provide a novel means for oxidizing metallic scrap prior to final disposal.

Other objects will appear from a study of the following specification when made in conjunction with the attached drawing, throughout which like numerals designate like parts, and wherein the single figure of the drawing is an elevational view, partly in section, of one embodiment of the present invention.

In general, the invention resides in the means and the method whereby the scrap caused during the grinding or cutting of work made of magnesium or alloyed with magnesium is collected, oxidized and exhausted during the machining process. When the magnesium or magnesium alloy scrap is thus disposed of, the resultant material is an oxide of magnesium which is non-combustible, and which may be handled along with the ordinary non-combustible scrap.

In the drawing, a piece of work 10, which may be of magnesium or a magnesium alloy, such as Dowmetal, is held by an operator 12 against the surface of an abrasive wheel 13 of a grinder designated generally as 11. The major portion of the wheel 13 is enclosed within a metal envelope or hood 14, connected to a duct 15 attached to the input of a fan or other conventional blower 16, the output of which is carried through a conduit 24 to a remote point of disposal. The bottom portion of envelope 14 includes a trough or scrap-receiving receptacle 25, which opens directly beneath the normal position in which the operator holds the work. Hood 14, including lower portion 26, along with duct 15, blower 16 and conduit 24, form an exhaust system, the function of which will be set forth below. A bin 29 has a throat portion opening into the exhaust system through an opening in hood 14. A clean-out door 30 is provided in bin 29.

A plurality of gas jets 18 and companion pilot jets 19 extend into the lower portion 26 of the receptacle or hood 14. Jets 18 and 19 are connected by conventional fittings to a supply pipe 17 containing illuminating gas, and a pet-cock or cut-off valve 20 is interposed between supply pipe 17 and jets 18, and cut-off valve 20 is connected by means of a link 27 to a treadle 21 having a restoring spring 22. When treadle 21 is depressed, cut-off valve 20 is opened, and gas flowing through the nozzles or jets 18 is ignited by the pilots 19. When treadle 21 is released, the restoring spring 22 acts to lift treadle 21 and cut off the flow of gas at valve 20. An auxiliary air jet 28 is positioned directly above the work 10, and is supplied by air from a source (not shown) through the delivery pipe 23.

The auxiliary jet 28 plays air upon the work 10, and drives all ground particles from the surface of the work 10, and forces them into the trough 25. It will be seen that all scrap will therefore be exhausted continuously during the grinding operation, and that the neighborhood of the grinding wheel 11 will be free from the accumulation of magnesium powder.

Merely drawing off the powder does not eliminate the hazard during storage and at the point of final disposal of the magnesium, and it is intended that at the beginning of the machining operation, the operator 12 will depress the treadle 21, and thus cause ample flame at jets 18 to burn the magnesium scrap passing through the bottom portion 26. The magnesium thus burned forms an oxide of magnesium which is a noncombustible powder, the handling of which entails no hazard.

During the operation of grinding the work 10, scrap magnesium, in the form of a fine powder or dust, falls into trough 25, and is carried by the induced draft created by blower 16 into the exhaust system, wherein the greater portion of the metallic oxide will be thrown into bin 29 by the centrifugal force of the particles themselves. The gaseous products of combustion are carried to the outside air by way of conduit 24.

The flame from jets 18, two of which are shown, is directed into the draft induced by means of blower 16, and need not come in contact at any time with the surface of the abrasive wheel 13. Although heat is generated in the combustion of the magnesium, it has been found that in the presence of sufficient draft, wheel 13 is not adversely affected by the burning of magnesium in the lower portion 26 of hood 14. Further, the wheel 13 is self-cooling because of its rotation in air.

It has been found that the invention has use not only as a safety measure in the machining of combustible scrap, but in the disposal of scrap from the ordinary iron and steel work processed in the ordinary machine shop. By subjecting non-combustible scrap from a grinder to the heat of flames from jets 18 in the presence of an exhausting draft, as above set forth, the fine powder or dust scrap will be fused or reformed into particles that are thrown by centrifugal force into bin 29, thus obviating the need of the conventional machine shop dust collecting system, or at least relieving such a system of the handling of metal scrap.

In certain applications of the invention, it may be preferable to utilize a forced draft, rather than an induced draft, and it will therefore be understood that such a change is within the scope of the present invention.

While for purposes of description, the invention is shown as applied to a grinding wheel, it is equally applicable to other machine tools, such as a lathe, a milling machine, a drill press, or the like. The invention is not to be restricted, therefore, to the particular form shown, but it is to be limited only by the scope of the appended claims.

What is claimed is:

1. In combination with a grinding wheel, means for eliminating the accumulation of ground particles of work being processed, comprising an envelope extending about the major portion of said wheel, a work receiving aperture in said envelope, a trough portion formed in said envelope below said work receiving aperture, so as to receive ground particles of work, an exhaust line connected to said envelope, a blower in said exhaust line connected to induce air from said envelope to flow through said exhaust line, and flame means disposed within said envelope posteriorly of said trough portion for oxidizing the particles.

2. In combination with a grinding wheel, an envelope extending about the periphery of said wheel for the major portion thereof and extending axially thereabout, an aperture in said envelope through which work may be projected for grinding, said envelope having a trough portion for receiving ground work particles, an air exhaust line connected to said envelope, means connected therewith for causing work particles from said trough portion to move through said exhaust line, means for delivering fuel to said envelope, and means for igniting said fuel as it enters said envelope, thus creating sufficient combustion to oxidize substantially all of the work particles prior to exhausting them through said exhaust line.

3. In combination with a machine for processing work, the processing of which results in the formation of small particles of the material being processed, a trough member disposed to receive work particles during processing, an exhaust line connected to said trough member, means associated therewith for drawing off said particles from said trough member through said exhaust line, means positioned between said trough member and said exhaust line for delivering fuel to be commingled with said work particles, and means for igniting said fuel as it emerges from said delivering means, whereby there is created sufficient combustion to oxidize substantially all of said work particles.

4. In combination with a machine tool, means for disposing of scrap of work being processed, comprising a scrap-receiving receptacle adjacent the normal position of the work, an exhaust conduit connected to said receptacle, means for blowing air through said receptacle and said exhaust conduit, and a flame jet within said receptacle.

5. The method of disposing of combustible machined scrap, which comprises collecting said scrap during the machining operation, delivering fuel to the point where said scrap is collected, and igniting said fuel at the said point of mixture with the scrap, to produce a combustion of both the fuel and the scrap at said point.

6. The method of disposing of combustible machined scrap, which comprises collecting said scrap continuously during the machining operation, delivering fuel to the point where said scrap is collected, igniting said fuel at the said point of scrap collection, to produce combustion of the commingled fuel and scrap at said point, and applying mechanical draft to the burning mixture of fuel and scrap.

HARRY J. WALPOLE.